(12) United States Patent  
Okada et al.

(10) Patent No.: US 7,779,946 B2
(45) Date of Patent: Aug. 24, 2010

(54) SNOWMOBILE

(75) Inventors: Hiroyuki Okada, Shizuoka (JP);
Koutaro Ogura, Shizuoka (JP)

(73) Assignee: Yamaha Hatsudoki Kabushiki Kaisha,
Shizuoka (JP)

( * ) Notice: Subject to any disclaimer, the term of this patent is extended or adjusted under 35 U.S.C. 154(b) by 103 days.

(21) Appl. No.: 11/954,744

(22) Filed: Dec. 12, 2007

(65) Prior Publication Data

US 2009/0152035 A1 Jun. 18, 2009

(51) Int. Cl.
*B62M 27/02* (2006.01)
(52) U.S. Cl. ........................ 180/190; 180/182
(58) Field of Classification Search .............. 180/182, 180/190
See application file for complete search history.

(56) References Cited

U.S. PATENT DOCUMENTS

| | | | | |
|---|---|---|---|---|
| 4,826,184 A | * | 5/1989 | Kuehmchel et al. | 280/21.1 |
| 5,174,258 A | * | 12/1992 | Tanaka | 123/198 E |
| 6,626,258 B1 | * | 9/2003 | Forbes | 180/184 |
| 7,096,988 B2 | * | 8/2006 | Moriyama | 180/190 |
| 7,413,046 B2 | * | 8/2008 | Okada et al. | 180/182 |

* cited by examiner

*Primary Examiner*—Lesley Morris
*Assistant Examiner*—Jacob Knutson
(74) *Attorney, Agent, or Firm*—Keating & Bennett, LLP

(57) ABSTRACT

A snowmobile includes steering handlebars, a pair of left and right skis, and a power transmission mechanism arranged to couple the steering handlebars and the skis. The power transmission mechanism includes a first rotary shaft extending directly downward or obliquely downward from the steering handlebars for rotation along with the steering handlebars; a first link mechanism coupled to the first rotary shaft; a second rotary shaft coupled to the first link mechanism and arranged to rotate along with the rotation of the first rotary shaft via the first link mechanism, the second rotary shaft being disposed on a different axis from that of the first rotary shaft; a second link mechanism disposed between the second rotary shaft and the skis; and a power steering device mounted to the second link mechanism as a part thereof and having an actuator to be driven based on the rotation of the second rotary shaft.

6 Claims, 4 Drawing Sheets

SNOWMOBILE

BACKGROUND OF THE INVENTION

1. Field of the Invention

The present invention relates to a snowmobile.

2. Description of the Related Art

Snowmobiles for running on snow are conventionally known. A snowmobile includes a pair of left and right skis disposed at the front bottom of the vehicle body, and steering handlebars for steering the skis. The steering handlebars and the skis are coupled via a power transmission mechanism including a link mechanism and so forth.

In recent years, proposals have been made to provide a power steering device to the power transmission mechanism in order to reduce the force required to steer the skis. U.S. Pat. No. 7,096,988 B2 discloses a snowmobile in which a power steering device is mounted at the lower end of a handlebar column for supporting steering handlebars. In this snowmobile, the power transmission mechanism includes a handle column as a rotary shaft, a link rod for longitudinal movement, a power transmission shaft as a rotary shaft, and a tie rod for longitudinal movement, in this order from the steering handlebars to the skis.

In the snowmobile disclosed in U.S. Pat. No. 4,826,184, the power transmission mechanism is made up of a rotary shaft such as a steering column and a connecting rod that is longitudinally expandable and contractable, and a power steering device including a hydraulic cylinder is mounted to the connecting rod.

In the snowmobile disclosed in U.S. Pat. No. 7,096,988 B2, the power steering device is provided at the lower end of the handle column so that a relatively large force supplied by the power steering device is transmitted to the skis via the link rod, the power transmission shaft and the tie rod. Therefore, the link rod, the power transmission shaft and so forth require a high degree of rigidity.

In the snowmobile disclosed in U.S. Pat. No. 4,826,184, the power steering device includes a hydraulic cylinder mounted to the connecting rod that is longitudinally expandable and contractable. Therefore, the total length of the power steering device and the connecting rod is large, which increases the size of the power transmission mechanism.

SUMMARY OF THE INVENTION

In order to overcome the problems described above and to improve upon the conventional devices, preferred embodiments of the present invention provide a power steering device of a snowmobile having a greatly reduced size and a power transmission mechanism of the snowmobile having a greatly reduced required rigidity.

A snowmobile according to a preferred embodiment of the present invention preferably includes steering handlebars, a ski, and a power transmission mechanism arranged to couple the steering handlebars and the ski, the power transmission mechanism including a first rotary shaft extending directly downward or obliquely downward from the steering handlebars for rotation along with the steering handlebars; a first link mechanism coupled to the first rotary shaft; a second rotary shaft coupled to the first link mechanism and arranged to rotate along with rotation of the first rotary shaft via the first link mechanism, the second rotary shaft being disposed on a different axis from that of the first rotary shaft; a second link mechanism disposed between the second rotary shaft and the ski; and a power steering device mounted to the second link mechanism as a part thereof and having an actuator to be driven based on rotation of the second rotary shaft.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
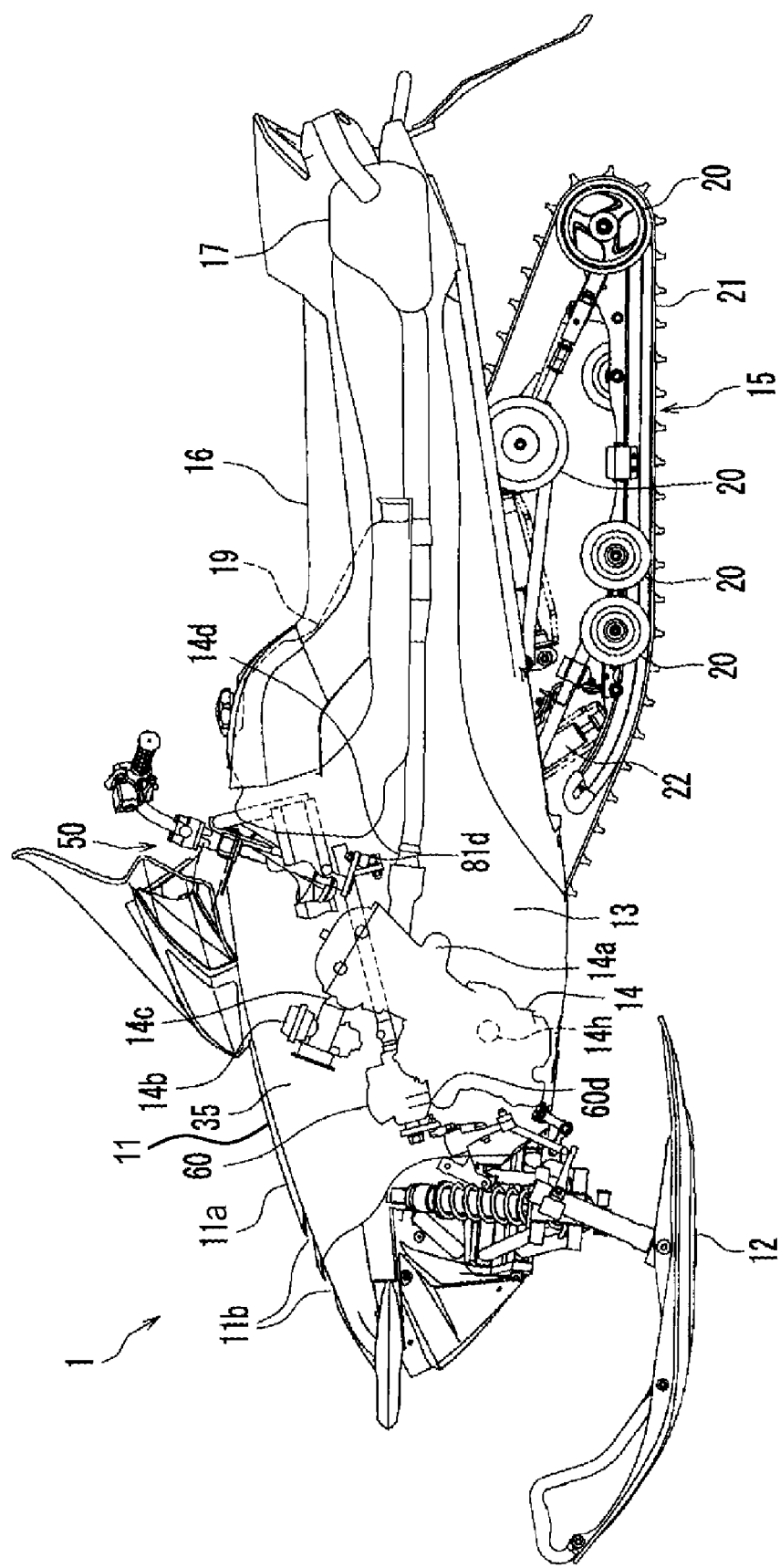
FIG. 1 is a left side view of a snowmobile in accordance with a preferred embodiment of the present invention.
Figure 2:
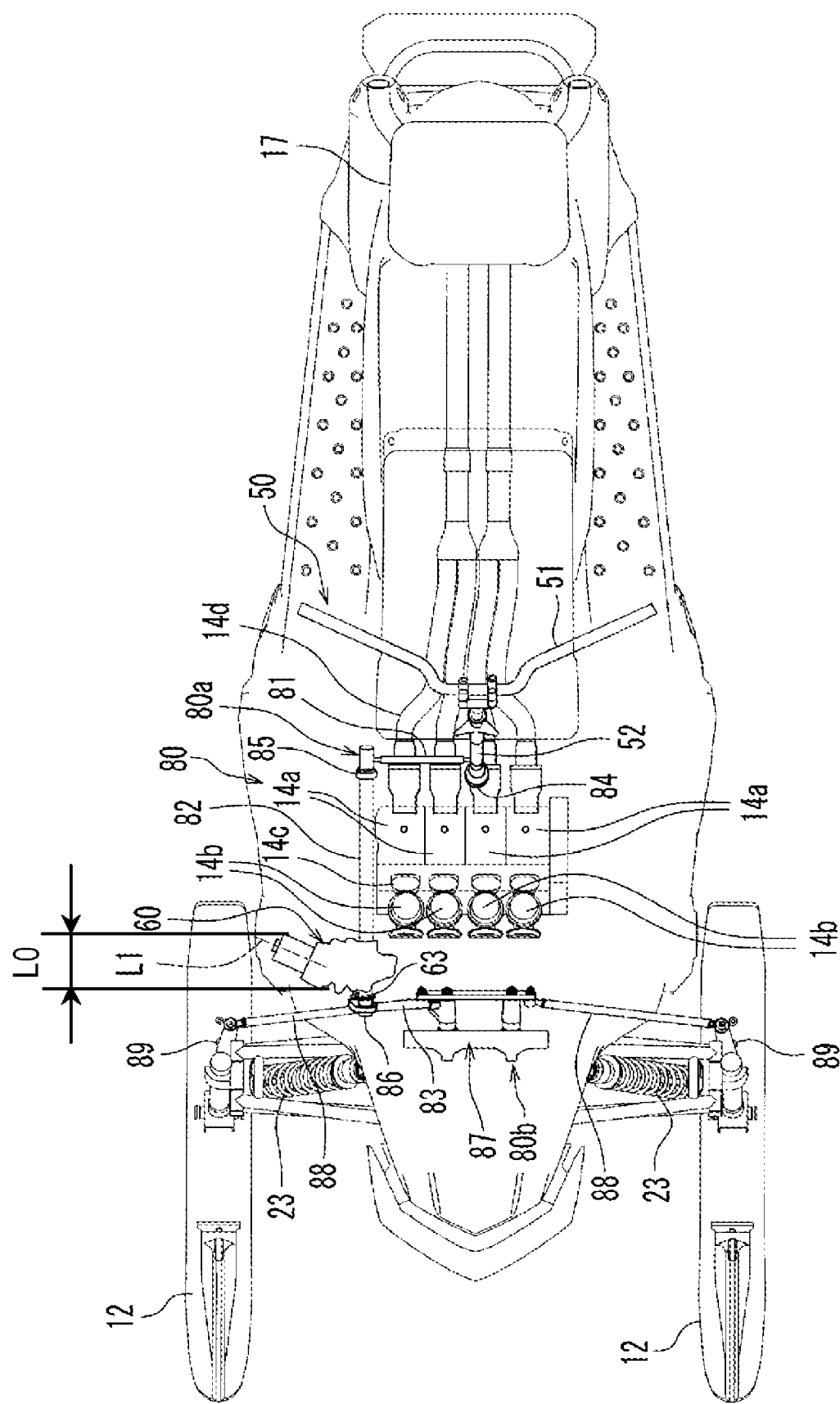
FIG. 2 is a plan view of the snowmobile in accordance with a preferred embodiment of the present invention.
Figure 3:
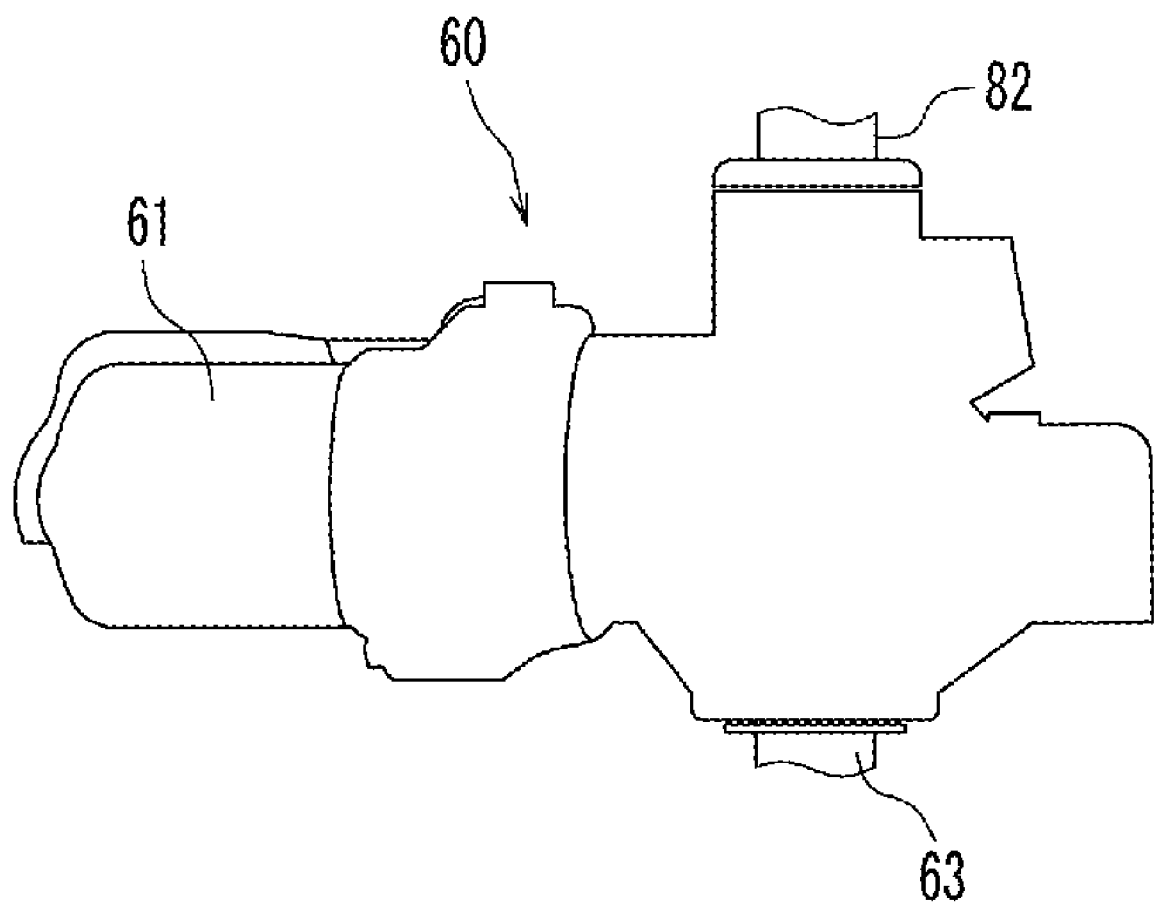
FIG. 3 is a front view of a power steering device.

As shown in FIGS. 1 to 3, a snowmobile 1 in accordance with a preferred embodiment of the present invention includes a vehicle body 11, a steering device 50 preferably including a pair of left and right skis 12 disposed at the lower front side of the vehicle body 11, an engine 14 disposed in an engine compartment 13 of the vehicle body 11, a drive track device 15 to be driven by the engine 14, and a seat 16 provided at the upper rear side of the vehicle body 11. A fuel tank 19 is disposed forward of the seat 16. In the following description, the terms "fore and aft" and "left and right" respectively refer to the fore and aft direction and the left and right direction as seen from the rider seated on the seat 16.

The drive track device 15 supports the rear part of the vehicle body 11. The drive track device 15 includes a plurality of wheels 20, and a track belt 21 wound around the wheels 20. Reference numeral 22 denotes a cushion unit.

The engine 14 preferably is a four cycle, four cylinder engine. The engine 14 includes a crankshaft 14h extending in the left and right direction of the vehicle, and four cylinders 14a each extending obliquely upward and rearward. The left and right direction of the vehicle corresponds to the vehicle width direction, and therefore is hereinafter occasionally referred to as "vehicle width direction". As shown in FIG. 2, the cylinders 14a are arranged to extend in the vehicle width direction. That is, in the snowmobile 1, the cylinder bank direction coincides with the vehicle width direction. An intake pipe 14c provided with a carburetor 14b is connected to the front side of each of the cylinders 14a. An exhaust pipe 14d is connected to the rear side of the cylinders 14a. The exhaust pipe 14d extends rearward from the cylinders 14a, and a muffler 17 is provided at the rear end of the exhaust pipe 14d.

As shown in FIG. 2, the steering device 50 preferably includes steering handlebars 51, the pair of left and right skis 12, and a power transmission mechanism 80. The power transmission mechanism 80 couples the steering handlebars 51 and the skis 12 to allow power transmission therebetween, and includes a so-called link mechanism. The power transmission mechanism 80 further includes a power steering device 60 attached to the link mechanism. The skis 12 are attached to the cushion unit 23 for free rotation in the vertical direction and in the horizontal direction to support the front part of the vehicle body 11 via the cushion unit 23.

The power transmission mechanism 80 includes a steering column 52 for supporting the steering handlebars 51, a first rod 81 coupled to the lower end of the steering column 52 via a lever 84 and extending generally rightward from the lever 84, and a second rod 82 coupled to the right end of the first rod 81 via a lever 85 and extending obliquely forward and downward from the lever 85. The steering column 52 forms a first rotary shaft for rotation along with the steering handlebars 51. The lever 84, the first rod 81 and the lever 85 constitute a first link mechanism 80a coupled to the steering column 52.

The second rod 82 is coupled to the first link mechanism 80a. The second rod 82 defines a second rotary shaft disposed on a different axis from that of the steering column 52 as the first rotary shaft. The second rod 82 is coupled to a rotary shaft 63 (see FIG. 4) of the power steering device 60. The second rod 82 thus serves as an input shaft of the power steering device 60. Hereinafter, the power transmission path in the power transmission mechanism 80 downstream of the second rod 82 is referred to as "second link mechanism 80b". The power steering device 60 constitutes a part of the second link mechanism 80b.

The power transmission mechanism 80 further includes a third rod 83. The third rod 83 is coupled to the rotary shaft 63 of the power steering device 60 via a lever 86, and extends obliquely leftward and downward from the lever 86. A parallel link 87 is coupled to the third rod 83, and a tie rod 88 is coupled to each of the left side and the right side of the parallel link 87. The right end of the right tie rod 88 is coupled to a knuckle arm 89 of the right ski 12. Likewise, the left end of the left tie rod 88 is coupled to a knuckle arm 89 of the left ski 12.

In this embodiment, the power steering device 60, the lever 86, the third rod 83, the parallel link 87, the tie rods 88 and the knuckle arms 89 constitute the second link mechanism 80b.

As the rider rotates the steering handlebars 51, the rotating force is transmitted via the steering column 52, the lever 84, the first rod 81, the lever 85 and the second rod 82 to the power steering device 60. Then, the power steering device 60 adds the driving force of a motor 61 to the rotating force of the second rod 82 to output the resultant force from the rotary shaft 63. The force output from the rotary shaft 63 is transmitted sequentially to the third rod 83, the parallel link 87, and the tie rods 88, which then reciprocate in the left and right direction. This causes the skis 12 to turn leftward and rightward.

In this way, in the snowmobile 1 in accordance with the present preferred embodiment, when the rider seated on the seat 16 steers the handlebars 51 while the vehicle is running, the resultant force of the steering force applied to the power steering device 60 via the steering column 52 and so forth and the power of the electric motor 61 is transmitted via the parallel link 87 and so forth to the left and right skis 12. This causes the left and right skis 12 to rotate in the same direction as the handlebars 51.

The power steering device 60 in accordance with the present preferred embodiment assists the rider to perform a steering operation. That is, when the rider rotates the steering handlebars 51 in the left direction or in the right direction, the power steering device 60 applies to the steering handlebars 51 a rotating force in the same direction that is larger than the rotating force applied by the rider. In this way, in the present preferred embodiment, both the rotating force by the rider and the driving force of the power steering device 60 are transmitted to the skis 12. However, the power steering device 60 in accordance with various preferred embodiments of the present invention may generate all the rotating force of the steering handlebars 51. In other words, in turning the skis 12, no force from the rider but only the driving force of the power steering device 60 may be transmitted to the skis 12.

The power steering device 60 in accordance with the present preferred embodiment is coupled to the lower end of the second rod 82. In other words, the power steering device 60 is coupled to a rotary shaft located downstream of the steering column 52 and disposed on a different axis from that of the steering column 52, instead of being coupled to the lower end of the steering column 52.

The power steering device 60 preferably includes an electric motor 61 (FIG. 3) as an actuator. As shown in FIG. 2, the power steering device 60 is disposed in such a posture that its length L0 in the fore and aft direction is smallest as compared to any other posture. Thus, a motor shaft 62 (see FIG. 4) of the electric motor 61 is tilted from both the fore and aft direction and the left and right direction of the vehicle. Symbol L1 represents the axial direction of the motor shaft 62. In this way, in the present preferred embodiment, the power steering device 60 is installed such that its length L0 in the fore and aft direction is smallest and such that the motor shaft 62 of the electric motor 61 is tilted from both the fore and aft direction and the left and right direction of the vehicle, instead of being installed such that the motor shaft 62 extends along the fore and aft direction or the left and right direction of the vehicle.

As shown in FIG. 1, in the snowmobile 1 in accordance with the present preferred embodiment, the power steering device 60 is disposed at a relatively low position. In this preferred embodiment, the power steering device 60 is disposed with its lower end 60d below the lower end 81d of the first rod 81. In addition, the power steering device 60 is disposed generally at the center of the vehicle body 11 in the vertical direction. To be exact, the power steering device 60 is disposed with its lower end 60d below the center of the vehicle body 11 in the vertical direction. The entirety of the power steering device 60 may be disposed below the center of the vehicle body 11 in the vertical direction.

Figure 4:
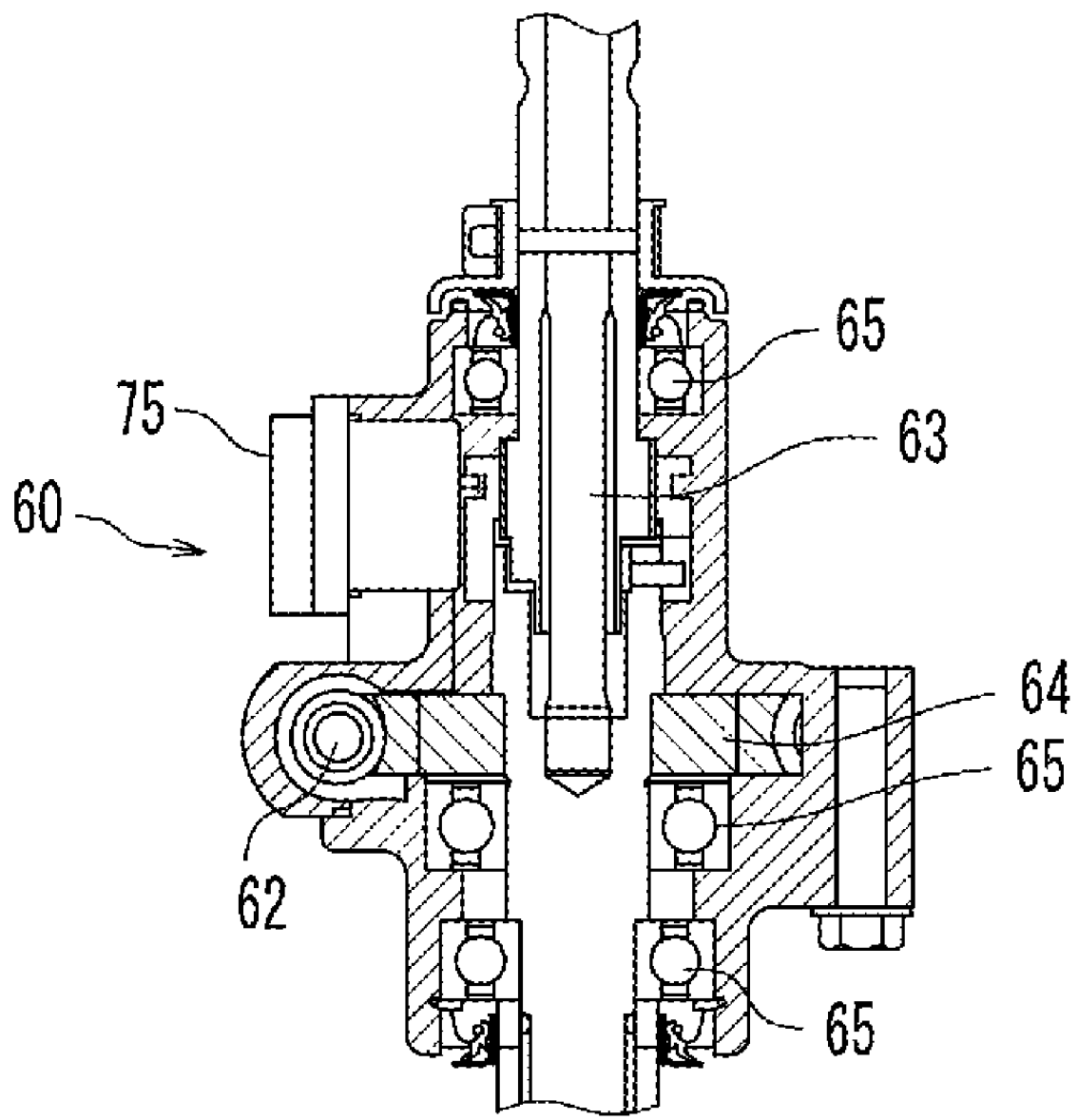
FIG. 4 is a cross sectional view of the power steering device.

FIG. 3 is a front view of the power steering device 60. FIG. 4 is a cross sectional view of the power steering device 60. As shown in FIG. 4, the power steering device 60 includes a gear 64 fixed to the rotary shaft 63 concentrically therewith. The gear 64 is meshed with the motor shaft 62 to rotate as the motor shaft 62 rotates. In this way, the rotation of the motor shaft 62 causes the gear 64 to rotate, which in turn causes the rotary shaft 63 to rotate. Reference numeral 65 denotes a bearing for supporting the rotary shaft 63 for free rotation. The power steering device 60 further includes a torque sensor 75 as a sensor for indirectly detecting the rotation of the steering handlebars 51. As the rider rotates the steering handlebars 51, the rotating force is transmitted via the steering column 52, the first link mechanism 80a and the rotary shaft 63 to the torque sensor 75. The power steering device 60 controls the electric motor 61 based on the detection results by the torque sensor 75. The sensor for detecting the rotation of the steering handlebars 51 is not limited to a torque sensor. The sensor for detecting the rotation of the steering handlebars 51 may be, for example, a sensor for detecting the rotating angle of the rotary shaft 63.

As shown in FIG. 1, air intake ports 11b arranged to introduce air are formed at the front side of the vehicle body cover 11a. An internal space 35 for guiding the air introduced from the air intake ports 11b is formed inside the vehicle body cover 11a. The power steering device 60 is disposed in the internal space 35. Therefore, the air introduced from the air intake ports 11b flows through the internal space 35 to be supplied to the power steering device 60. Since the power steering device 60 is disposed at a relatively low position, the air introduced from the air intake ports 11b is easily supplied to the power steering device 60.

In the snowmobile including the power steering device 60, in general, a portion of the power transmission mechanism 80 upstream of the power steering device 60 and a portion of the power transmission mechanism 80 downstream of the power steering device 60 require different rigidities from each other. Specifically, the portion upstream of the power steering device 60 is applied with only the steering force of the rider, that is, human force, while the portion downstream of the power steering device 60 is applied with the resultant force of the steering force of the rider and the driving force of the electric motor 62. Therefore, the portion downstream of the power steering device 60 requires a higher rigidity than that required by the portion upstream thereof.

According to the snowmobile 1 in accordance with the present preferred embodiment, the power steering device 60 is coupled to the second rod 82, instead of being coupled to the lower end of the steering column 52. Therefore, according to the snowmobile 1 in accordance with this preferred embodiment, it is possible to reduce the portion of the power transmission mechanism 80, for coupling the steering handlebars 51 and the skis 12, that requires a relatively high rigidity. Specifically, in the case where the power steering device 60 is coupled to the lower end of the steering column 52, the lever 84, the first rod 81, the lever 85, the second rod 82, the lever 86, the third rod 83, the parallel link 87 and the tie rods 88 are disposed downstream of the power steering device 60. On the other hand, according to the snowmobile 1 in accordance with this preferred embodiment, the lever 84, the first rod 81, the lever 85 and the second rod 82 are disposed upstream of the power steering device 60, while the third rod 83, the parallel link 87 and the tie rods 88 are disposed downstream of the power steering device 60. In this way, according to the snowmobile 1 in accordance with this preferred embodiment, there are a relatively larger number of parts in the portion of the power transmission mechanism 80 upstream of the power steering device 60, while there a relatively smaller number of parts in the portion downstream of the power steering device 60, than conventional snowmobiles. Therefore, it is possible to reduce the number of parts in the portion that requires a relatively high rigidity.

In this snowmobile 1, since the rigidity of the portion upstream of the power steering device 60 can be reduced, the weight of the portion upstream of the power steering device 60 can be reduced. It is thus possible to reduce the weight of the portion upstream of the power steering device 60.

As shown in FIG. 2, according to the snowmobile 1 in accordance with this preferred embodiment, the power steering device 60 is disposed at the right end of the space in the vehicle body 11. In other words, the power steering device 60 is disposed at an end in the left and right direction of the vehicle. Therefore, a relatively large space can be secured at the center of the space in the vehicle body 11 in the left and right direction. In this preferred embodiment, the engine 14 is disposed in this space. According to this snowmobile 1, since the power steering device 60 is disposed at an end in the left and right direction of the vehicle, interference between the power steering device 60 and the engine 14 can be easily avoided.

According to the snowmobile 1 in accordance with this preferred embodiment, the air intake ports 11b for introducing air are formed at the front side of the vehicle body cover 11a. Therefore, it is possible to efficiently introduce air from ahead into the internal space 35 of the vehicle body cover 11a, and to effectively cool the power steering device 60 with the air. Thus, it is possible to more reliably prevent the electric motor 61 of the power steering device 60 from overheating.

In addition, according to the snowmobile 1 in accordance with the present preferred embodiment, the power steering device 60 is disposed at a relatively low position. Therefore, snow blown up as the vehicle runs contacts the power steering device 60 to cool the power steering device 60. However, snow may not necessarily be utilized to cool the power steering device 60, and as a matter of course, snow may be prevented from contacting the power steering device 60.

As discussed above, according to the snowmobile 1 in accordance with this preferred embodiment, the power steering device 60 is disposed at a relatively low position in the vehicle body 11, with the lower end 60d of the power steering device 60 below the lower end 81d of the first rod 81. Therefore, the center of gravity of the entire snowmobile 1 is accordingly low. The low center of gravity of the snowmobile 1 contributes to the improvement of its running performance.

In the above-described preferred embodiment, the actuator of the power steering device 60 preferably is the electric motor 61. However, the actuator of the power steering device 60 may not necessarily be the electric motor 61, and may be a hydraulic motor, for example.

The present invention is not limited to the above-described preferred embodiments, but various variations and modifications may be made without departing from the scope of the present invention. The presently disclosed preferred embodiments are therefore considered in all respects to be illustrative and not restrictive. The scope of the present invention is indicated by the appended claims rather than the foregoing description, and all changes which come within the meaning and range of equivalence thereof are intended to be embraced therein.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A snowmobile comprising:
   steering handlebars;
   a ski; and
   a power transmission mechanism arranged to couple the steering handlebars and the ski, the power transmission mechanism including:
   a first rotary shaft extending directly downward or obliquely downward from the steering handlebars and arranged to rotate along with the steering handlebars about a first rotary axis extending along a length of the first rotary shaft;
   a first link mechanism coupled to the first rotary shaft;
   a second rotary shaft coupled to the first link mechanism and arranged to rotate along with rotation of the first rotary shaft about a second rotary axis extending along a length of the second rotary shaft via the first link mechanism, the second rotary axis being different from the first rotary axis; and
   a second link mechanism disposed between the second rotary shaft and the ski; wherein
   the second link mechanism includes a power steering device mounted to the second rotary shaft and including an actuator arranged to receive a rotating force of the second rotary shaft and output a resultant force to the ski via the second link mechanism.

2. The snowmobile according to claim 1, wherein the actuator is an electric motor.

3. The snowmobile according to claim 1, further comprising a vehicle body, wherein the power steering device is disposed at an end of the vehicle body in a left and right direction of the vehicle.

4. The snowmobile according to claim 1, further comprising:
a vehicle body cover including an air intake port arranged to introduce air and defining an air chamber to guide the air introduced from the air intake port to the power steering device.

5. The snowmobile according to claim 1, wherein the first link mechanism includes a rod extending in a left and right direction of the vehicle, and the power steering device is disposed such that its lower end is positioned below a lower end of the rod.

6. The snowmobile according to claim 1, further comprising a vehicle body, wherein an entirety of the power steering device is disposed below a center of the vehicle body in a vertical direction.

* * * * *